C. C. WORTHINGTON.
COOLING SYSTEM FOR INTERNAL COMBUSTION ENGINES.
APPLICATION FILED SEPT. 10, 1904.

917,232.

Patented Apr. 6, 1909.

Witnesses:

Charles C. Worthington, Inventor

By Attorney

UNITED STATES PATENT OFFICE.

CHARLES C. WORTHINGTON, OF DUNNFIELD, NEW JERSEY.

COOLING SYSTEM FOR INTERNAL-COMBUSTION ENGINES.

No. 917,232.

Specification of Letters Patent.

Patented April 6, 1909.

Application filed September 10, 1904. Serial No. 223,961.

*To all whom it may concern:*

Be it known that I, CHARLES C. WORTHINGTON, a citizen of the United States, residing at Dunnfield, Warren county, New Jersey, whose post-office address is the same, have invented certain new and useful Improvements in Cooling Systems for Internal-Combustion Engines, of which the following is a full, clear, and concise specification.

The invention relates to cooling systems for the internal combustion engines of self-impelled vehicles, and consists in means for maintaining an air current upon the parts to be cooled when the vehicle is slowed down or at rest, as hereinafter described and more particularly pointed out in the claims.

Figure 1:
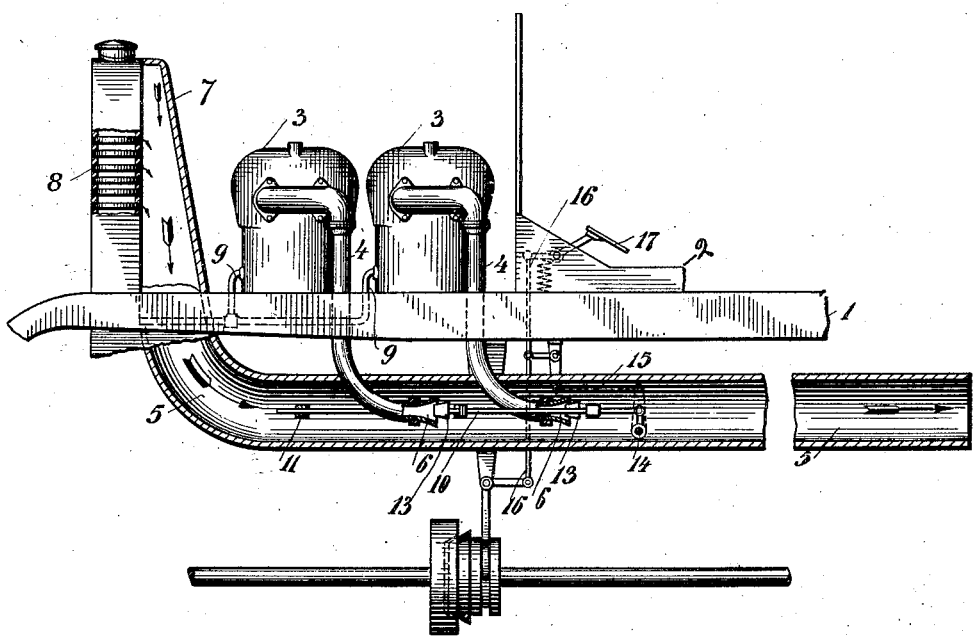
Figure 2:
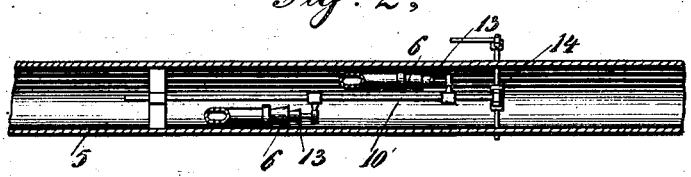

In the accompanying drawing, Figure 1 represents one form of the invention applied to a self-impelled vehicle of the kind wherein the engines are carried forward of the main body of the car, certain of the parts being shown in vertical longitudinal section; and Fig. 2 is a horizontal section through a portion of the air passage shown in Fig. 1.

The vehicle illustrated comprises the usual side girders 1 by which the body 2, the engine 3 and other usual parts are carried on the wheels, not shown. The exhaust gases from the engine or engines 3 are led through a suitable conduit or conduits 4, 4, into a pipe or air passage 5, and the discharging ends of the said exhaust conduit or conduits, which may be provided with attached nozzles 6, as indicated, are arranged so as to expel the gases toward the outlet of said air passage in the rear of the vehicle. The pipe or air passage 5 is suitably supported or hung from any convenient part of the vehicle, and is preferably disposed as compactly and inconspicuously as possible beneath the car body. At its forward end it merges into an enlarged, forwardly opening chamber or hood, marked 7, which serves to collect and conduct air into and through the air passage when the vehicle is in motion. The radiator 8 or such part or parts of the propelling mechanism as require to be cooled are disposed in the path of the air current entering and passing through the hood and the passage 5. As shown in the drawing, the radiator 8 is placed in front of the hood. It is connected, by the usual circulation pipes 9, with the water jackets of the engines, which latter are of the internal combustion type.

The rearward discharge of the exhaust gases within the air passage, by its inductive action, supplements the current produced by the motion of the vehicle, and at such times as when the vehicle is slowed down or stationary, but with the engine still running, it maintains an air current in the air passage, so that the cooling of the radiator or the engine is continued independently of the motion of the vehicle. The inductive effect of the exhaust discharge is increased, according to this invention, by providing the conduit or conduits 4, 4 with means for varying the size of their discharge openings, which means will ordinarily be operated to restrict the opening when the vehicle is slowed down or stationary, and by thus increasing the velocity of discharge, will also increase the velocity of the air current induced in the passage and hence will maintain the cooling action. The restriction of the exhaust discharge will of itself reduce the speed of the engine, which is desirable when the vehicle is at rest.

The variable restricting means may consist of a plug or plugs 13 carried on a slide rod 10 longitudinally mounted within the air passage 5, so as to be movable, more or less, into the discharging orifices of the nozzles 6. The slide rod may be operated in any desired manner, but the invention contemplates the employment of the usual clutch pedal for this purpose so that when the clutch is thrown out the exhaust will be simultaneously restricted and the induced air current correspondingly and immediately increased. The operating connections for this purpose include a crank shaft 14 for operating the slide rod 10 and link connections 15 with the clutch rod 16 of pedal 17.

I claim:

1. In a self-impelled vehicle, the combination of an air passage containing therein a part to be cooled, an internal combustion engine having its exhaust pipe disposed within said passage for inducing an air current therethrough and means for variably restricting the discharge from said exhaust pipe to increase its inductive effect.

2. In a cooling system for self-impelled vehicles, an air passage, a part therein to be cooled, an internal combustion engine for impelling the vehicle, having its exhaust pipe disposed within said passage to induce a current of air therein, and a substantially conical plug movably mounted in the orifice of said discharge conduit whereby the induction in the passage is increased when the exhaust is throttled.

3. The combination in a self-impelled vehicle, of an internal combustion engine, having an exhaust pipe and a throttle for said pipe, a clutch for transmitting the motion of the engine to the vehicle wheels, and means for releasing said clutch having a connection with said throttle for simultaneously restricting the discharge from said exhaust pipe.

4. In a self-impelled vehicle, an air passage containing therein a part to be cooled, an internal combustion engine for driving the vehicle having its exhaust pipe disposed to induce an air current within said passage, and a throttle for said pipe adapted to restrict the discharge within said passage, in combination with a clutch in the driving connections between the engine and vehicle wheels and means for releasing said clutch adapted simultaneously to operate said throttle to restrict the discharge.

In testimony whereof, I have signed my name to the specification in the presence of two subscribing witnesses.

CHARLES C. WORTHINGTON.

Witnesses:
W. J. P. MOORE,
H. R. HEGELER.